United States Patent
Tsengas et al.

(10) Patent No.: US 9,357,747 B1
(45) Date of Patent: Jun. 7, 2016

(54) SWITCHGRASS CAT LITTER

(71) Applicant: OurPet's Company, Fairport Harbor, OH (US)

(72) Inventors: Steven Tsengas, Fairport Harbor, OH (US); Konstantine Tsengas, Fairport Harbor, OH (US)

(73) Assignee: OURPET'S COMPANY, Fairport Harbor, OH (US)

( * ) Notice: Subject to any disclaimer, the term of this patent is extended or adjusted under 35 U.S.C. 154(b) by 0 days.

(21) Appl. No.: 14/852,498

(22) Filed: Sep. 12, 2015

Related U.S. Application Data

(63) Continuation-in-part of application No. 14/512,904, filed on Oct. 14, 2014, now abandoned, and a continuation-in-part of application No. 14/831,729, filed on Aug. 20, 2015, said application No. 14/512,904 is a continuation-in-part of application No. 13/612,349, filed on Sep. 12, 2012, now abandoned, which is a continuation-in-part of application No. 13/108,268, filed on May 16, 2011, now abandoned, which is a continuation-in-part of application No. 12/912,168, filed on Oct. 26, 2010, now abandoned, which is a continuation-in-part of application No. 12/170,694, filed on Jul. 10, 2008, now abandoned.

(60) Provisional application No. 60/965,011, filed on Aug. 17, 2007.

(51) Int. Cl.
*A01K 29/00* (2006.01)
*A01K 1/015* (2006.01)

(52) U.S. Cl.
CPC ............ *A01K 1/0155* (2013.01); *A01K 1/0154* (2013.01)

(58) Field of Classification Search
CPC .. A01K 1/0152; A01K 1/0154; A01K 1/0155
USPC .................................. 119/171–174
See application file for complete search history.

(56) References Cited

U.S. PATENT DOCUMENTS

| | | | | |
|---|---|---|---|---|
| 4,258,660 A * | 3/1981 | Pris | A01K 1/0155 119/171 |
| 4,405,354 A * | 9/1983 | Thomas, II | A01K 1/0152 119/171 |
| 4,437,429 A * | 3/1984 | Goldstein | A01K 1/0154 119/172 |
| 4,529,407 A * | 7/1985 | Johnston | C10L 5/14 44/542 |
| 4,686,937 A * | 8/1987 | Rosenfeld | A01K 1/0155 119/173 |
| 4,698,225 A * | 10/1987 | Morrison | A23K 1/003 426/302 |
| 4,721,059 A * | 1/1988 | Lowe | A01K 1/0155 119/172 |
| 5,106,637 A * | 4/1992 | Forwood | A23K 1/001 426/237 |
| 5,188,064 A * | 2/1993 | House | A01K 1/0155 119/172 |
| 5,230,305 A * | 7/1993 | House | A01K 1/0155 119/171 |
| 5,507,250 A * | 4/1996 | Reddy | A01K 1/0154 119/173 |
| 5,634,431 A * | 6/1997 | Reddy | A01K 1/0152 119/173 |
| 5,690,052 A * | 11/1997 | Sladek | A01K 1/0155 119/171 |
| 6,089,190 A * | 7/2000 | Jaffee | A01K 1/0154 119/172 |
| 6,098,569 A * | 8/2000 | Kent | A01K 1/0155 119/171 |
| 6,206,947 B1 * | 3/2001 | Evans | A01K 1/0152 119/171 |
| 6,220,206 B1 * | 4/2001 | Sotillo | A01K 1/0155 119/171 |
| 6,245,732 B1 * | 6/2001 | Gallon | C11D 3/128 510/101 |
| 6,408,790 B1 * | 6/2002 | Maguire | A01K 1/0114 119/165 |
| 6,543,385 B2 * | 4/2003 | Raymond | A01K 1/0154 119/171 |
| 6,662,749 B1 * | 12/2003 | Wiedenhaft | A01K 1/0155 119/172 |
| 6,817,315 B1 * | 11/2004 | Tsengas | A01K 1/0155 119/171 |
| 7,089,882 B1 * | 8/2006 | Tsengas | A01K 1/0155 119/171 |
| 7,757,638 B2 * | 7/2010 | Wang | A01K 1/0155 119/171 |
| 2004/0112297 A1 * | 6/2004 | Rasner | A01K 1/0155 119/172 |
| 2007/0054807 A1 * | 3/2007 | Schnabel | A01N 47/28 504/127 |
| 2007/0193063 A1 * | 8/2007 | Lundell | F26B 1/00 34/543 |

* cited by examiner

*Primary Examiner* — Joshua Huson
(74) *Attorney, Agent, or Firm* — John D. Gugliotta

(57) ABSTRACT

A cat litter product is provided and includes manufacture primarily from a pelletized Switchgrass. The litter product is pelletized via an extrusion technology process so as to form particles the size of wheat grain. The litter product provides, collectively, a non-toxic and naturally safe, biodegradable, odor-eliminating, scented, anti-bacterial litter that clumps in a convenient size for easy disposal and which has little dust and reduces tracking by cats.

17 Claims, No Drawings

SWITCHGRASS CAT LITTER

RELATED APPLICATIONS

The present application is a Continuation in Part of U.S. Ser. No. 14/512,904 filed on Oct. 13, 2014, which was a Continuation in Part of U.S. Ser. No. 13/612,349 filed on Sep. 12, 2012, which was a Continuation in part of U.S. Ser. No. 13/108,268 filed on May 16, 2011 which was a Continuation-in-part of U.S. Ser. No. 12/912,168 filed on Oct. 26, 2010, which was a Continuation in Part of U.S. Ser. No. 12/170,694 filed on Jul. 10, 2008, which claimed the benefit of U.S. Provisional Ser. No. 60/965,011 and it claims priority to that provisional's Aug. 17, 2007 filing date. The present application further incorporates all of the subject matter of these prior related applications as if they are rewritten in its entirety herein.

BACKGROUND OF THE INVENTION

1. Field of the Invention

The present invention relates generally to an improved cat litter and, more specifically, to a cat litter that comprises an ingredient of Switchgrass in a pelletized form.

2. Description of the Related Art

The rising costs of ethanol production in the United States is causing an increase in the price of many commodities. A recent high for the cost of dried distillers grain, due to a demand for ethanol as a fuel source, is causing the prices of milk, dairy and other products to increase. Consumers are absorbing these costs, which become even greater at the times production is adversely affected by the weather.

This same demand is affecting the manufacturing costs of the litter products that mainly comprise a dried distillers grain in their compositions, the increase of which is passed on to consumers. A need is felt for a means to maintain the costs of litter manufacture while not compromising the effectiveness of the cat litter. The present invention teaches a pelletized litter composition comprising a Switchgrass added to or replacing a conventional dried distillers grain.

Switchgrass is very low in cost and its use in a litter composition can reduce the costs of the litter's raw material by as much as 40%. Switchgrass is a perennial product that is capable of producing a tremendous yield per acreage. Another advantage to Switchgrass is that it stands up to poor soil and poor climate conditions; it is essentially drought resistant.

Switchgrass is abundant in the central United States and its inclusion in litter compositions helps control the costs of manufacture and sale. It remains an effective binding ingredient and it does not compromise the efficiency of the litter's ability to suppress musky odors.

A search of the prior art reveals no patents that utilize the pelletized Switchgrass feature taught in the present invention. U.S. Pat. No. 4,258,660 to Pris et al. teaches a litter composition that comprises natural grasses. Natural grasses, such as grass straws and alfalfa, are litter ingredients well known in the art; however, these natural grasses are not the same as the switchgrass taught herein, but they rather include most plants grown as cereals. Switchgrass is distinguishable because it not a plant grown as a cereal and it is therefore not encompassed in any broad teachings for grass straws. There is no reference known to teach Switchgrass in litter.

SUMMARY OF THE INVENTION

It is therefore an object of the present invention to provide an improved cat litter that comprises Switchgrass in a pelletized form.

It is an object of the present cat litter to remain both an effective binding ingredient and an efficient odor suppressant and eliminator.

It is further an object that the present litter composition be a non-toxic and a naturally safe one.

It is an object of the present invention to provide an improved cat litter that is biodegradable.

It is another object of the present invention to provide an improved cat litter that is pleasant scented.

It is another object of the present invention to provide an improved cat litter having anti-microbial agents.

It is another object of the present invention to provide an improved cat litter that clumps in a convenient size for easy disposal and, additionally, one that comprises a texture which reduces the litter tracked around a home by cats.

It is another object of the present invention to provide an improved cat litter which requires no manufacture from the grains highly demanded for ethanol productions.

It is yet another object of the present invention to provide an improved litter with exhibits the features described herein above, while at the same time maximizing the total volume percentage of the lowest cost commodity components in order to provide an economically efficient formulation for retail use.

One embodiment of the present invention is briefly described herein, wherein an improved cat litter is manufactured from a pelletized Switchgrass, along with starch sources including wheat bran, corn starch, and wheat screenings, at least one anti-microbial agent, anti-odor agents, calcium carbonate and a salt compound (preferably sodium bicarbonate, an addition of which further improves litter density and cost production).

In yet another embodiment of the present invention, the improved cat litter is manufactured with a *Yucca Schidigera* or zeolite such that it is comprised of either all or a combination of the following ingredients: a pelletized Switchgrass, a modified starch, *Yucca Schidigera*, zeolite, at least one anti-microbial agent, anti-odor agents, calcium carbonate and a salt compound It is an object that the general method of manufacture for the present cat litter formula comprise a mash distillation process and an extrusion technology process such that the size of each pellet is that of a wheat grain.

DESCRIPTION OF THE PREFERRED EMBODIMENTS

1. Detailed Description of the Composition

An improved cat litter is provided comprised of a composition which includes the following ingredients: Switchgrass, a starch source, at least one anti-microbial agent, a mold inhibitor agent (preferably a buffered propionic acid based mold inhibitor manufactured by Alltech of Lexington, Ky. and sold under the tradename MOLD-ZAP™). The cat litter may additionally comprise a combination of wheat bran and wheat screenings to increase overall bulk and as a means to provide additional strength to the pellets.

Each of the aforementioned ingredients may have one or more sub-components. For example, the salt compound is preferably sodium bicarbonate; however, potassium carbonate and calcium carbonate are envisioned as being selected alone or in combination.

Switchgrass, known as *Panicum Virgatum*, is a dominant species of the Central North American tallgrass prairie. It is debatingly not considered a viable and an efficient energy source because of the greater amount of fossil energy required to produce fuel. Therefore, its costs will remain considerably lower than that of dried distillers grains. It is envisioned that the Switchgrass replaces dried distillers grains and that it is an efficient replacement to accomplish the same as that of the grains. In one aspect of the present invention an animal litter composition may include switchgrass at approximately between 60% to 80% by weight of the resulting litter product.

Modified corn starch is a polysaccharide, which is the most common agent used to provide cohesiveness, or clumping, of a litter when it is used. Suitable agents may additionally be added to the litter composition for clumping, such as dextrins, maltodetrins, flours, cellulosics, hemicellulosics, arabinoxylans and the many varieties of starches. In addition, other suitable agents facilitating occlusivity or clumping may be added, such as guar gum. Further still, other suitable agents facilitating pelletizing may be added, such as ammonium lignosulfanate. In one aspect of the present invention an animal litter composition may include a modified starch or starches at approximately between 10% to 30% by weight of the resulting litter product. In another aspect of the present invention an animal litter composition may include guar gum at approximately between 0.05% to 0.50% by weight of the resulting litter product.

The mold inhibiting agents facilitate a protection against the formation and initiation of and a development of the microbes, such as molds, that may be harmful to a cat and the cat's owner. The mold inhibitor agents may be selected from sodium propionate, calcium propionate or a similar known chemical(s), and for product development testing selected as a buffered propionic acid based mold inhibitor manufactured by Alltech of Lexington, Ky. and sold under the tradename MOLD-ZAP™. In addition to the agents suggested, additional anti-microbial compounds may be included with those already suggested so as to provide a maximum protection against a formation of microbes, bacteria or molds. In one aspect of the present invention an animal litter composition may include an antimicrobial agent or agents at approximately 0.1% by weight of the resulting litter product.

It is also anticipated that a combination of wheat bran and wheat screenings may be added to the composition as a means to provide additional physical strength to the pellets as well as overall bulk and texture to the litter. In one aspect of the present invention an animal litter composition may include a wheat bran and/or wheat screenings at approximately between 5% to 20% by weight of the resulting litter product.

In yet an alternate embodiment, Yucca Schidigera, zeolite and/or calcium montmorillonite are comprised in the litter composition. Yucca Schidigera is a plant typically found in the desert regions of Arizona, California, Nevada, Utah and Mexico. Among its many properties, the Yucca Schidigera's ability to bind and to neutralize ammonia is relevant to a cat litter formula. Natural saponins, which are emulsifying or foaming agents, are found in the leaves of the Yucca Schidigera and are the chemicals responsible for binding and neutralizing the annoying and the harmful odors associated with the ammonia formed in the litter after the breakdown of urea. The natural saponins may also act to neutralize the odors associated with cat feces, as Yucca Scutigera is also used in animal foods to help neutralize feces odor within the intestinal tract of an animal so that when the feces are passed, the odor is less objectionable. In addition to the natural saponins from Yucca Scutigera, additional anti-odor agents may be added to further curb the smell generated from waste deposited in the cat litter. In one aspect of the present invention an animal litter composition may include a Yucca Scutigera at approximately between 0.05% to 0.10% by weight of the resulting litter product.

Zeolite is a natural mineral consisting of silica and alumina. Zeolite has a unique interconnecting lattice structure arranged to form a honeycomb framework of consistent diameter interconnecting channels and pores. Negatively-charged alumina building blocks and neutrally-charged silica building blocks are stacked thereby to produce an open, three dimensional honeycomb framework. Odors and gases, such as those produced by ammonia, are attracted to and trapped within the zeolite crystalline structure. Zeolite also adsorbs and desorbs water, thus eliminating and preventing mildew formation. Calcium montmorillonite has been used and tested as a lower cost alternative to providing the function of zeolite in the composition. In one aspect of the present invention an animal litter composition may include a water binding mineral of either zeolite and/or calcium montmorillonite at approximately between 5% to 15% by weight of the resulting litter product.

In addition to the preferred compositions, other suitable agents facilitating occlusivity or clumping may be added. These agents include a mixture of detrins, maltodetrins, flours, and arabinoxylans. Additionally, the use of guar gum as a functional equivalent has been found to provide binding among the composition's physical granules, but at a lower functional cost to other alternatives.

Finally, while the presently disclosed litters have been found to have an improved result generally, it has been found that in a further improvement, the incorporation of a surfactant can aid in the formation of urine based clumps. The use of polydimethylsiloxane (PDMS) or similar non-toxic wetting agents, results in liquid being directed downward into the litter in a more concentrated formation (rather than diffusing about the surface of the litter prior to penetrating) provides the additional benefit of a denser packed 'clump' that is more easily removed from the remaining bulk litter and disposed. Functionally alternative to the sue of PDMS would be various other sources of soap or surfactants, including, but not limited to, lecithin. Such a feature is found to be preferable to pet owners during cleaning of the remaining litter. In one aspect of the present invention an animal litter composition may include a surfactant or wetting agent at approximately between 0.01% to 0.05% by weight of the resulting litter product.

Cat litter recipes according to the preferred embodiment were tested for clump weight and clumping strength. The recipes of Table 1 were slightly modified by adding lecithin as an additive to reduce surface pooling and improve infiltration. This modification subsequently allowed us to reduce particle size to increase the surface area of material exposed to liquid as a strategy to reduce clump size and enhance absorption. The ratio between the different particle sizes was shifted as shown in Table 2.

TABLE 1

Recipes for cat litter batches.

| Recipe | Ingredient | % composition |
|---|---|---|
| A | Wheat bran | 5-20 |
|  | Switchgrass | 60-80 |
|  | Corn starch | 10-30 |
|  | calcium montmorillonite | 5-15 |
|  | Mold Zap | 0.1 |
|  | Yucca Schidigera | 0.05 |
| B | Wheat bran | 10 |
|  | Switchgrass | 74.2 |
|  | Corn starch | 10 |
|  | lecithin | 0.01-0.05 |
|  | calcium montmorillonite | 5 |

TABLE 1-continued

Recipes for cat litter batches.

| Recipe | Ingredient | % composition |
|---|---|---|
| | Mold Zap | 0.05 |
| | Yucca Schidigera | 0.05 |

TABLE 2

Ratio of particle size for different recipes

| Recipe | Medium | Fine | Very Fine |
|---|---|---|---|
| A | 78.5 | 15 | 6.5 |
| B | 78 | 15 | 7 |

2. Detailed Description of the Method of Manufacture

In practicing the present invention, the general method of manufacture is comprised in a pelletizing of the Switchgrass. This pelletizing is accomplished by means of the same technology that is utilized to pelletize wheatgrass. The following ingredients are added to the Switchgrass to form a litter product: modified corn starch, wheat bran and wheat screenings in combination, an anti-odor agent, and at least one anti-microbial agents. Additional pelletization aids, such as ammonium lignosulfate sold under the trade name PEL TUFF may be used to improve the handling and maintain the structural integrity of the of the pelletized litter. The litter product is suitably dried to a powder and is processed through a pelletizer via an extrusion technology process so as to form particles, each having a size approximating that of a grain of wheat. The particles are then bagged and sealed.

The foregoing description is included to illustrate the operation of the preferred embodiment and is not meant to limit the scope of the invention. As one can envision, an individual skilled in the relevant art, in conjunction with the present teachings, is capable of incorporating many minor modifications that are anticipated within this disclosure. The foregoing descriptions of specific embodiments of the present invention have been presented for the purposes of illustration and description. They are not intended to be exhaustive nor to limit the invention to the precise forms disclosed and, obviously, many modifications and variations are possible in light of the above teaching. The embodiments are chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. An animal litter composition consisting essentially of:
   Switchgrass at approximately between 60% to 80% by weight of the resultant litter product;
   modified starch at approximately between 10% to 30% of said weight of said litter product;
   calcium montmorillonite at approximately between 5% to 15% of said weight of said litter product;
   wheat bran at approximately between 5% to 20% of said weight of said litter product; and
   Yucca Schidegira at approximately 0.05% to 0.10% of said weight of said litter product.

2. The animal litter of claim 1, further comprising:
   guar gum at approximately between 0.05% to 0.50% of said weight of said litter product.

3. The animal litter of claim 2, further comprising a surfactant to reduce surface pooling and improve infiltration.

4. The animal litter of claim 3, wherein said surfactant comprises approximately between 0.01% to 0.05% of said weight of said litter product.

5. The animal litter of claim 4, wherein said surfactant is selected from the group comprising: polydimethylsiloxane; lecithin; and soap.

6. The animal litter of claim 1, further comprising a surfactant to reduce surface pooling and improve infiltration.

7. The animal litter of claim 6, wherein said surfactant comprises approximately between 0.01% to 0.05% of said weight of said litter product.

8. The animal litter of claim 1, further comprising an active anti-biological agent added as a means to facilitate a protection against a formation of microbes, bacteria or molds, wherein said anti-biological agent comprises an antimicrobial agents at 0.1% of said weight of said litter product.

9. An animal litter consisting of:
   Switchgrass, said Switchgrass for providing liquid absorbency and bulk to the overall animal litter;
   modified starch, said modified starch is added as a means to provide litter cohesiveness or clumping;
   a bulking material selected from the group comprising wheat bran and wheat screenings for increasing litter density and reducing overall production cost;
   an ammonia and water binding material selected from the group comprising zeolite and calcium montmorillonite for binding ammonia and water, thereby neutralizing ammonia production and mildew formation; and,
   Yucca Schidegira, said Yucca Schidegira is provided as a means to inhibit a urease enzyme from converting urine to ammonia and thereby neutralizing an ammonia production.

10. An animal litter consisting of:
    Switchgrass, said Switchgrass for providing liquid absorbency and bulk to the overall animal litter;
    modified starch, said modified starch is added as a means to provide litter cohesiveness or clumping;
    a bulking material selected from the group comprising wheat bran and wheat screenings for increasing litter density and reducing overall production cost;
    an ammonia and water binding material selected from the group comprising zeolite and calcium montmorillonite for binding ammonia and water, thereby neutralizing ammonia production and mildew formation;
    Yucca Schidegira, said Yucca Schidegira is provided as a means to inhibit a urease enzyme from converting urine to ammonia and thereby neutralizing an ammonia production; and
    guar gum at approximately between 0.05% to 0.50% of said weight of said litter product.

11. An animal litter consisting of:
    Switchgrass, said Switchgrass for providing liquid absorbency and bulk to the overall animal litter;
    modified starch, said modified starch is added as a means to provide litter cohesiveness or clumping;
    a bulking material selected from the group comprising wheat bran and wheat screenings for increasing litter density and reducing overall production cost;
    an ammonia and water binding material selected from the group comprising zeolite and calcium montmorillonite for binding ammonia and water, thereby neutralizing ammonia production and mildew formation;

*Yucca Schidegira*, said *Yucca Schidegira* is provided as a means to inhibit a urease enzyme from converting urine to ammonia and thereby neutralizing an ammonia production; and a surfactant at approximately between 0.01% to 0.05% of said weight of said litter product.

12. The animal litter of claim 11, wherein said surfactant is selected from the group comprising: polydimethylsiloxane; lecithin; and soap.

13. An animal litter consisting of:

Switchgrass, said Switchgrass for providing liquid absorbency and bulk to the overall animal litter, said Switchgrass at approximately 74% by weight of the resultant litter product;

modified starch, said modified starch is added as a means to provide litter cohesiveness or clumping, said modified starch at approximately 10% of said weight of said litter product;

a bulking material selected from the group comprising wheat bran and wheat screenings for increasing litter density and reducing overall production cost, said bulking material comprising wheat bran at approximately 10% of said weight of said litter product; and an ammonia and water binding material selected from the group comprising zeolite and calcium montmorillonite for binding ammonia and water, thereby neutralizing ammonia production and mildew formation, said ammonia and water binding material at approximately 5% of said weight of said litter product; and,

*Yucca Schidegira*, said *Yucca Schidegira* is provided as a means to inhibit a urease enzyme from converting urine to ammonia and thereby neutralizing an ammonia production, said *Yucca Schidegira* at 0.05% of said weight of said litter product.

14. An animal litter consisting of:

Switchgrass, said Switchgrass for providing liquid absorbency and bulk to the overall animal litter, said Switchgrass at approximately 74% by weight of the resultant litter product;

modified starch, said modified starch is added as a means to provide litter cohesiveness or clumping, said modified starch at approximately 10% of said weight of said litter product;

a bulking material selected from the group comprising wheat bran and wheat screenings for increasing litter density and reducing overall production cost, said bulking material comprising wheat bran at approximately 10% of said weight of said litter product;

an ammonia and water binding material selected from the group comprising zeolite and calcium montmorillonite for binding ammonia and water, thereby neutralizing ammonia production and mildew formation, said ammonia and water binding material at approximately 5% of said weight of said litter product;

*Yucca Schidegira*, said *Yucca Schidegira* is provided as a means to inhibit a urease enzyme from converting urine to ammonia and thereby neutralizing an ammonia production, said *Yucca Schidegira* at 0.05% of said weight of said litter product; and a surfactant to reduce surface pooling and improve infiltration at between approximately 0.01-0.5% of said weight of said litter product.

15. An animal litter consisting of:

Switchgrass, said Switchgrass for providing liquid absorbency and bulk to the overall animal litter, said Switchgrass at approximately 74% by weight of the resultant litter product;

modified starch, said modified starch is added as a means to provide litter cohesiveness or clumping, said modified starch at approximately 10% of said weight of said litter product;

a bulking material selected from the group comprising wheat bran and wheat screenings for increasing litter density and reducing overall production cost, said bulking material comprising wheat bran at approximately 10% of said weight of said litter product;

an ammonia and water binding material selected from the group comprising zeolite and calcium montmorillonite for binding ammonia and water, thereby neutralizing ammonia production and mildew formation, said ammonia and water binding material at approximately 5% of said weight of said litter product;

*Yucca Schidegira*, said *Yucca Schidegira* is provided as a means to inhibit a urease enzyme from converting urine to ammonia and thereby neutralizing an ammonia production, said *Yucca Schidegira* at 0.05% of said weight of said litter product; and a pelletizing aid comprising ammonium lignosulfanate.

16. The animal litter of claim 15, wherein said litter composition is pelletized so as to form particles.

17. An animal litter consisting of:

Switchgrass, said Switchgrass for providing liquid absorbency and bulk to the overall animal litter, said Switchgrass at approximately 74% by weight of the resultant litter product;

modified starch, said modified starch is added as a means to provide litter cohesiveness or clumping, said modified starch at approximately 10% of said weight of said litter product;

a bulking material selected from the group comprising wheat bran and wheat screenings for increasing litter density and reducing overall production cost, said bulking material comprising wheat bran at approximately 10% of said weight of said litter product;

an ammonia and water binding material selected from the group comprising zeolite and calcium montmorillonite for binding ammonia and water, thereby neutralizing ammonia production and mildew formation, said ammonia and water binding material at approximately 5% of said weight of said litter product;

*Yucca Schidegira*, said *Yucca Schidegira* is provided as a means to inhibit a urease enzyme from converting urine to ammonia and thereby neutralizing an ammonia production, said *Yucca Schidegira* at 0.05% of said weight of said litter product;

a pelletizing aid comprising ammonium lignosulfanate; and a clumping aid comprising guar gum.

* * * * *